Patented Sept. 14, 1937

2,093,047

UNITED STATES PATENT OFFICE 2,093,047

PROCESS OF MANUFACTURING STABLE HUMUS PRODUCTS

Joost Hudig, Wageningen, and Nikolaas Hendrik Siewertsz van Reesema, Delft, Netherlands No Drawing. Application March 26, 1934, Serial No. 717,536. In the Netherlands April 1, 1933

9 Claims. (Cl. 71—27)

The object of the invention is the manufacture of soil improvers containing a substantial amount of complex compounds of humic acids, silicic acid, aluminium and bivalent metals, having a high base exchanging power and being substantially insoluble in water at a pH value of 6.5 which is the usual hydrogen ion concentration of well managed soil.

We have found that humus substances in the form of such complex compounds as the stable humus of good soils, and in contradistinction to the humus matter in stable-yard manure and artificial nitrogenous organic fertilizers, are resistant to bacterial combustion in the soil and remain there. Thus a permanent humus action and increased base-exchanging power are imparted to the soil by application thereto of the products according to the invention.

The invention relates to a process of manufacturing soil improvers of the character indicated above, which comprises heating a thorough mixture of materials containing a substantial amount of humic acids with readily hydrolizable alumino silicates of bivalent metals in moist condition so as to produce stable humus products which are insoluble in water having a hydrogen ion concentration pH between 6 and 7.

Under "readily hydrolizable insoluble aluminosilicates of bivalent metals" we understand products which are substantially insoluble in water but which are decomposed at the ordinary temperature in a short time (within 2 hours), even by very weak acids, e. g. aqueous liquids having a pH value of 5. The bivalent bases are liberated and if suitable organic substances are present the silicic acid and aluminium are adsorbed by the same so that the hydrolysis of the aluminosilicate can proceed. Silicates of this character are produced by rapid cooling of molten mixtures containing the constituents.

We preferably use porous readily hydrolizable aluminosilicates which also contain iron and manganese compounds. A suitable starting material is the commercial product sold under the name of "Silicakalk".

The readily hydrolizable silicates of bivalent metals may also contain monovalent metals. In this case however, the bivalent metals, expressed in terms of equivalents, must predominate in the combination.

As humic acid containing materials we can use naturally occurring products with a high percentage of humic acids, e. g. lignite, or ammoniacal extracts of the same. We may also use artificially produced humic acids which can be obtained by oxidation in an alkaline medium or by the action of alkali at elevated temperatures from suitable organic materials according to partly known methods. The products may contain the humic acids as such or alkali compounds of the same.

According to an embodiment of the invention the humic acids are produced by oxidizing fossile or recent organic products, such as peat, waste materials of lignified vegetable materials, e. g. straw, chaff, husks, wood pulp or products obtained from the same, in moist condition at moderately elevated temperatures by means of oxygen or gases containing or producing oxygen. Oxidation can be effected before adding the aluminosilicates; however, it is also possible to mix the starting materials with the aluminosilicates and to subject the mixture to the oxidizing treatment.

It is a well-known fact that humic acids can be produced from fossile or recent organic products, e. g. peat, lignite and vegetable materials containing lignified lignine, by auto-oxidation in an alkaline medium (cp. Soubeiran, Journal für praktische, Chemie, Vol. 50 (1850) p. 291, Chemiker Zeitung, Vol. 34 (1910) p. 1157, Brennstoff Chemie 1922 p. 161-167 and 183-184, German specification No. 559,254). From the cited literature it is known that the rate of oxidation is higher in an alkaline medium than in an acid medium and that ammonia can be used for creating the alkaline medium. It is also a well-known fact that the oxidation can be promoted by iron and manganese compounds.

It has further been proposed to break up alkali and alkaline earths containing minerals by oxidizing a mixture of the same with materials such as peat, lignite and coal under pressure at high temperatures.

The object of the invention, however, is the manufacture of the inorganic-organic complexes of the character described above which are produced by the action of materials containing humic acids on readily hydrolizable aluminosilicates at moderately elevated temperatures.

According to the invention products of superior colloidal properties are obtained by providing for a final pH value of the product produced by the treatment of the materials containing humic acids with the aluminosilicates of 6–7. If the mixture is alkaline the pH value can be reduced by blowing air through the same or by introducing weak acids; if the degree of acidity is too high ammonia can be introduced.

According to a feature of the invention the oxidation of the organic substances and the manufacturing of the organic complex can be effected while controlling and periodically varying the alkalinity or acidity of the mixture. For this purpose ammonia may be used and in this case we obtain a final product containing nitrogen just like the stable humus products of the good soils. For reducing the alkalinity weak acids can be used, the said acids being preferably introduced in gaseous vaporous form.

The substance used for controlling the pH value, can be added in varying amounts and varying concentrations; in this way it is possible to have a relatively high alkalinity during predetermined periods of the process and to reduce the alkalinity or to render the mixture acid in other periods.

We can start e. g. with a gas mixture containing 1–10% of ammonia, thus causing a strongly alkaline reaction and then to finish the treatment with a very small amount of ammonia or with weak acids. This process is very suitable e. g. for starting materials of a strongly acid character, such as certain types of lignites.

In other cases, e. g. with certain kinds of peat, it is advantageous to introduce small amounts of ammonia in the first stage of the process, so that the mixture is only slightly alkaline or even acid, and to provide for a strongly alkaline reaction in a later stage, by increasing the percentage of ammonia in the gas mixture e. g. up to 10%. The process is finished with a very slightly alkaline or even slightly acid reaction by reducing the percentage of ammonia in the gas or by adding a weak acid.

According to a preferred embodiment of the invention the alumino-silicates are treated with nitrogenous humic acid containing products from which more than 50% of the nitrogen can be distilled in the form of ammonia by adding bases, e. g. magnesium oxide or dilute caustic soda, the said nitrogenous products being obtained before or after adding the aluminosilicates by oxidizing fossile or recent organic products in moist condition at moderately elevated temperature and controlling the hydrogen ion concentration during oxidation by introducing ammonia and if necessary weak acids so as to maintain the pH value substantially between 6 and 7 and always under 9. We have found that in this way organic aluminosilico-complexes are obtained with a relatively high percentage of nitrogen in such a form that it can be readily utilized by the plants but which are nevertheless substantially insoluble in water and cannot easily be washed out.

Both the treatment with aluminosilicates and the oxidization are generally effected at temperatures under 100° C.

It has also been found that the percentage of nitrogen which can be distilled with magnesium oxide can be further increased by adding iron and oxide can be further increased by adding iron and manganese compounds, e. g. reduced iron, manganese oxides, ferrous or ferric sulphate or manganese sulphate. The iron and manganese compounds also act as catalysts for the oxidation.

When the nitrogenous humus products described above are made to react with the easily hydrolizable aluminosilicates complex compounds are produced from which after having been adjusted to a pH value of 6–7 only very small amounts of organic substances are dissolved in neutral water and which contain the nitrogen capable of being distilled in the form of ammonia after adding magnesium oxide for the greater part in insoluble form or at least in such a form that it cannot readily be washed out; however, it can readily be displaced by other bases. The degree of solubility depends on the ratio of the easily hydrolizable silicates and the nitrogenous humus products and on the character of the materials used. It is possible to select the proportions of the starting materials so as to obtain a complex compound with a pH value between 6 and 7, which is practically insoluble in neutral water.

The nitrogenous products manufactured according to the invention have a high adsorption power and high interchanging power for bases, e. g. ammonia. They contain a considerable proportion of the nitrogen in the form of ammonia which can be distilled with magnesium oxide but which is nevertheless present in insoluble form. This explains why the nitrogen in products of this character has a much more favourable action than in the well-known products which contain the nitrogen principally in the form of ammonium compounds soluble in water or as so called "Kernstickstoff". In the latter case the nitrogen is not interchangeable and cannot so easily be utilized by the plants. The products obtained according to the present process have the property of being resistant against bacterial combustion, just like the stable humus of good soils and in contradistinction to the well-known nitrogenous organic fertilizers, and the action of the humus contained in the products according to the invention has a permanent character.

They are therefore of great value for improving arable soils.

According to a preferred embodiment of the invention the oxidation of fossile or recent organic products is effected by introducing a mixture of the said starting materials with the readily hydrolizable aluminosilicates in a vessel with a sieve bottom and spraying the mass at moderately elevated temperatures with water, the oxidation being effected by the air carried along by the water. The amount of water is controlled so as to maintain a relatively dry looking mass which is not covered by a layer of liquid. Alternatively the organic products can be first oxidized in the way indicated above and subsequently be mixed with the aluminosilicate. The vessel is preferably insulated; the gas mixture which may be preheated is introduced through the sieve bottom. The air may be admixed with oxygen or ozone.

Instead of a vessel with a sieve bottom other means can be used for distributing the gas mixture through the mass; the mass can e. g. be treated on a perforated conveyor belt.

The aluminosilicates used have the property of making the mass loose and porous so that the resistance for the gases in generally low.

When the complexes according to the invention are treated with dilute hydrochloric acid (1/20 N) insoluble inorganic-organic humus complexes remain which are saturated with hydrogen ions and which after washing with water are soluble in alkaline solutions to a large extent. The solutions obtained are precipitated by adding bivalent bases.

During the manufacturing process high temperatures must be avoided as they are more or less detrimental for the colloidal properties desired. The treatment is accordingly effected at temperatures generally not exceeding 100° C.

It has been found that it is often advantageous not to introduce the oxygen containing gases during the whole process. According to an embodiment of the invention the material treated with ammonia and air according to one of the processes indicated above are saturated with ammonia and maintained at a moderately elevated temperature in a closed room. In this way compounds are obtained in which not only the percentage of total nitrogen but also the proportion of nitrogen capable of being distilled with magnesium oxide is increased. The action of this treatment is especially favourable if the gas mixture used for the oxidizing step contains ozone.

Example 1

100 kgs. of sphagnum peat are thoroughly mixed with 12 kgs. of "Silicakalk", ½ kg. of manganese dioxide, ½ kg. of ferric oxide and a sufficient amount of water to produce a moist mass. The mixture is introduced into a suitable vessel and air and water vapour of about 70° C. are passed through the same. A controlled amount of ammonia gas is introduced so as to maintain the pH value between 5 and 7. When the "Silicakalk" is hydrolyzed in this acid medium to a sufficient extent, the proportion of ammonia is increased so that the pH value of the mixture rises to 9 or more. Finally the excess of ammonia is removed by passing air through the mass and a slightly acid product (pH value between 6 and 7) is obtained.

Example 2

100 kgs. of humic substances precipitated by adding a small excess of acid to a solution obtained by extracting lignite with ammonia are thoroughly mixed with 10–12 kgs. of "Silicakalk" and maintained in moist condition at a temperature of 70° C. during 24 hours.

Example 3

100 kgs. of sphagnum peat are thoroughly mixed with 1 kg. of reduced iron and 100 kgs. of water. The mixture is treated in a closed vessel with a sieve bottom at 70° C. with humid air, the air being introduced through the sieve bottom and exhausted from the top of the vessel after passing through the mixture. The air contains a controlled proportion of ammonia and the pH value of the mass is thereby maintained under 9 and substantially between 6 and 7. The reaction is finished with a pH between 6 and 7. The product obtained in this way is thoroughly mixed with "Silicakalk" and maintained at a temperature of about 70° C. The final product is adjusted at a pH value between 6 and 7; if necessary by blowing air through the mass or introducing ammonia.

Example 4

100 kgs. of sphagnum peat are treated in the same way as in example 3, with this difference, however, that after oxidizing with humid air the material is saturated with ammonia. The mixture is maintained for some time at a moderately elevated temperature and the excess of ammonia is subsequently removed by blowing air through the mass. The material is now thoroughly mixed with "Silicakalk" and treated as indicated in Example 3.

The "Silicakalk" referred to above is a calcium aluminium silicate having approximately the following composition:

| | Per cent. |
|---|---|
| CaO | 43.1 |
| SiO$_2$ | 32.4 |
| Al$_2$O$_3$ | 15.2 |
| MgO | |
| Fe$_2$O$_3$+FeO | |
| MnO | Small amounts |
| SO$_4$ | |
| S | |

A calcium aluminium silicate of the above composition is rapidly decomposed by slightly acidulated water having a hydrogen ion concentration of 5.

The combination of calcium with silicic acid and aluminium oxide is effected in the blast furnace. The material which is obtained at very high temperature (1450° C.) in liquid form, is very rapidly cooled so that it is in a suitable condition for further treatment which consists in comminuting the material to the desired size.

We claim:

1. A process of manufacturing soil improvers with a high interchanging power for bases comprising mixing aluminosilicates of bivalent bases having the property of being decomposed within two hours at the ordinary temperature in an aqueous liquid possessing a pH value of 5 with organic substances adapted to produce humic acids by oxidation and subjecting the said mixture in moist condition to an oxidizing action at moderately elevated temperature, so as to produce stable humus products which are insoluble in water having a pH value between 6 and 7.

2. A process of manufacturing soil improvers with a high interchanging power for bases comprising mixing aluminosilicates containing bivalent bases and a relatively small amount of monovalent bases and having the property of being decomposed within two hours at the ordinary temperature in an aqueous liquid possessing a pH value of 5 with organic substances adapted to produce humic acids by oxidation and subjecting the said mixture in moist condition to an oxidizing action at moderately elevated temperature, so as to produce stable humus products which are insoluble in water having a pH value between 6 and 7.

3. A process of manufacturing soil improvers with a high interchanging power for bases comprising mixing aluminosilicates of bivalent bases having the property of being decomposed within two hours at the ordinary temperature in an aqueous liquid possessing a pH value of 5 with organic substances adapted to produce humic acids by oxidation, subjecting the said mixture in moist condition to an oxidizing action at a moderately elevated temperature and adjusting the final hydrogen ion concentration to a pH value between 6 and 7, so as to produce stable humus products which are insoluble in water having a pH value between 6 and 7.

4. A process of manufacturing soil improvers with a high interchanging power for bases comprising mixing aluminosilicates of bivalent bases having the property of being decomposed within two hours at the ordinary temperature in an aqueous liquid possessing a pH value of 5 with organic substances adapted to produce humic acids by oxidation, subjecting the said mixture in moist condition to an oxidizing action at moderately elevated temperature, maintaining the pH value of the material during oxidation substantially between 6 and 7 and always under 9 by introducing ammonia, so as to produce nitrogenous stable humus products which are insoluble in water having a pH value between 6 and 7 and which contain the nitrogen in such a form that more than 50% of the same can be distilled in the form of ammonia after adding a caustic potash solution.

5. A process of manufacturing soil improvers with a high interchanging power for bases comprising mixing aluminosilicates of bivalent bases having the property of being decomposed within two hours at the ordinary temperature in an aqueous liquid possessing a pH value of 5 with organic substances adapted to produce humic acids by oxidation subjecting the said mixture in moist condition to an oxidizing action at mod- 6. A process of manufacturing soil improvers with a high interchanging power for bases comprising mixing aluminosilicates of bivalent bases having the property of being decomposed within two hours at the ordinary temperature in an aqueous liquid possessing a pH value of 5 with organic substances adapted to produce humic acids by oxidation, subjecting the said mixture in moist condition to an oxidizing action at moderately elevated temperature, maintaining the pH value of the material during oxidation substantially between 6 and 7 and always under 9 by introducing ammonia, saturating the material with ammonia after finishing the oxidation and maintaining the mixture at a moderately elevated temperature, so as to produce nitrogenous stable humus products which are insoluble in water having a pH value between 6 and 7 and which contain the nitrogen in such a form that more than 50% of the same can be distilled in the form of ammonia after adding a caustic potash solution.

7. A process of manufacturing soil improvers with a high interchanging power for bases comprising mixing aluminosilicates of bivalent bases having the property of being decomposed within two hours at the ordinary temperature in an aqueous liquid possessing a pH value of 5 with organic substances adapted to produce humic acids by oxidation, subjecting the said mixture in moist condition to an oxidizing action at moderately elevated temperature, maintaining the pH value of the material during oxidation substantially between 6 and 7 and always under 9 by introducing ammonia, saturating the material with ammonia after finishing the oxidation, maintaining the mixture at a moderately elevated temperature and subsequently removing the excess of ammonia, so as to produce nitrogenous stable humus products which are insoluble in water having a pH value between 6 and 7 and which contain the nitrogen in such a form that more than 50% of the same can be distilled in the form of ammonia after adding a caustic potash solution.

8. A process of manufacturing soil improvers with a high interchanging power for bases comprising mixing aluminosilicates of bivalent bases having the property of being decomposed within two hours at the ordinary temperature in an aqueous liquid possessing a pH value of 5 with organic substances adapted to produce humic acids by oxidation and subjecting the said mixture in moist condition to an oxidizing action by heating the mixture at a moderately elevated temperature in a container, simultaneously spraying water in the upper part of the container and removing water with gas entrained therein at the bottom of the container, so as to produce stable humus products which are insoluble in water having a pH value between 6 and 7.

9. A process of manufacturing soil improvers with a high interchanging power for bases comprising mixing alumino silicates of bivalent bases having the property of being decomposed within two hours at the ordinary temperature in an aqueous liquid possessing a pH value of 5 with organic substances adapted to produce humic acids by oxidation and subjecting the said mixture in moist condition to an oxidizing action at moderately elevated temperature in the presence of a catalyst taken from a group consisting of iron and manganese compounds so as to produce stable humus products which are insoluble in water having a pH value between 6 and 7.

JOOST HUDIG.
NIKOLAAS HENDRIK
    SIEWERTSZ van REESEMA.